US007254408B2

(12) United States Patent
Kim (10) Patent No.: US 7,254,408 B2
(45) Date of Patent: Aug. 7, 2007

(54) APPARATUS AND METHOD FOR GENERATING A CALLING TONE OF WIRE/WIRELESS TELEPHONE

(75) Inventor: June-Do Kim, Yongin (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 311 days.

(21) Appl. No.: 10/774,628

(22) Filed: Feb. 10, 2004

(65) Prior Publication Data

US 2004/0162111 A1 Aug. 19, 2004

(30) Foreign Application Priority Data

Feb. 13, 2003 (KR) ............... 10-2003-0009223

(51) Int. Cl.
*H04Q 7/20* (2006.01)
(52) U.S. Cl. ............... 455/462; 455/458; 379/375.01
(58) Field of Classification Search ............... 455/462, 455/456.2, 458, 567; 379/372, 373.01, 373.02, 379/374.02, 375.01, 376.01
See application file for complete search history.

(56) References Cited

U.S. PATENT DOCUMENTS

| 4,229,620 A | 10/1980 | Schaible |
| 4,310,722 A | 1/1982 | Schaible |
| 4,639,726 A * | 1/1987 | Ichikawa et al. .......... 340/7.41 |
| 4,884,294 A | 11/1989 | Inagami |
| 5,117,504 A | 5/1992 | Dennerlein et al. |
| 5,170,172 A | 12/1992 | Weinstein |
| 5,198,800 A | 3/1993 | Tozawa et al. |
| 5,651,051 A * | 7/1997 | Stuart ...................... 455/463 |
| 5,805,667 A | 9/1998 | Alvarez et al. |
| 5,952,918 A | 9/1999 | Ohayon |
| 5,995,852 A * | 11/1999 | Yasuda et al. .............. 455/567 |
| 6,075,456 A * | 6/2000 | Park ...................... 340/825.49 |
| 6,134,320 A * | 10/2000 | Swan et al. ................. 379/372 |
| 6,166,652 A | 12/2000 | Benvenuti |
| 6,473,628 B1 | 10/2002 | Kuno et al. |

(Continued)

FOREIGN PATENT DOCUMENTS

| EP | 0 876 040 | 2/2000 |
| GB | 0 865 188 | 9/1998 |
| KR | 10-1996-45743 | 2/1999 |

*Primary Examiner*—Edward F. Urban
*Assistant Examiner*—Blane J. Jackson
(74) *Attorney, Agent, or Firm*—Robert E. Bushnell, Esq.

(57) ABSTRACT

In an apparatus and a method for processing a calling tone of a wire/wireless telephone, if an RF signal corresponding to a ring receiving generation control signal is transmitted to a portable device from a fixed device after a ring signal is received in the fixed device of the wire/wireless telephone, the portable device measures the distance between the fixed device and the portable device according to electric field strength of the RF signal transmitted by the fixed device. If the measured distance is less than a preset reference distance, the portable device disables generation of the calling tone and the calling tone is generated in the fixed device only. Thus, when the fixed device is near the portable device, only the fixed device processes the calling tone for receiving a ring signal, and the problem of user inconvenience caused by lack of harmony between melody chords generated in the fixed device and the portable device is solved.

23 Claims, 6 Drawing Sheets

U.S. PATENT DOCUMENTS

| | | |
|---|---|---|
| 6,484,027 B1 | 11/2002 | Mauney et al. |
| 6,782,251 B2 * | 8/2004 | Kagay, Jr. .................... 455/410 |
| 2001/0029187 A1 * | 10/2001 | Cannon et al. ............. 455/462 |
| 2003/0013495 A1 * | 1/2003 | Oleksy ........................ 455/567 |
| 2004/0066932 A1 * | 4/2004 | Seligmann ............. 379/373.01 |
| 2004/0203353 A1 * | 10/2004 | Connor ....................... 455/41.1 |

* cited by examiner

APPARATUS AND METHOD FOR GENERATING A CALLING TONE OF WIRE/WIRELESS TELEPHONE

CLAIM OF PRIORITY

This application makes reference to, incorporates the same herein, and claims all benefits accruing under 35 U.S.C. § 119 from my application APPARATUS AND METHOD PROCESSING CALLING TONE OF WIRE/WIRELESS TELEPHONE filed with the Korean Industrial Property Office on 13 Feb. 2003 and there duly assigned Serial No. 10-2003-9223.

BACKGROUND OF INVENTION

1. Technical Field

The present invention generally relates to an apparatus and a method for generating a calling tone of a wire/wireless telephone and, more specifically, to an apparatus and a method for generating a calling tone of a wire/wireless telephone in dependence upon sensed distance between a portable device (wireless telephone) and a fixed device (fixed body or base of a telephone) according to electric field strength of a received ring signal when the ring signal is received in a portable device of the wire/wireless telephone, and for selectively controlling generation of the calling tone according to the sensed distance.

2. Related Art

Generally, a wire/wireless telephone is composed of a fixed device (wired telephone) and a portable device (wireless telephone). The fixed device can directly make a call to the outside by being connected to a wire line, and the portable device can make a call to the outside by wireless communication with the fixed device.

When a call is generated from the outside, the wire/wireless telephone system generates a calling tone in the fixed device, and immediately transmits a ring sensing signal to the portable device, thereby processing a ring calling tone in the portable device. Thus, the ring calling tone simultaneously rings in the fixed device and in the portable device.

In this case, ring calling bell sounds simultaneously occur in both the fixed device and the portable device. If the bell sound of the fixed device is louder than that of the portable device, it may be difficult to locate the portable device when a user wants to answer the phone with the portable device having the relatively smaller ring calling bell sound.

Also, when the wire/wireless telephone is an IT phone having a portable device, it is supposed to produce a higher sound by using a device having more than forty chords. However, since the calling tone of the portable device is designed to have a buzzer or a single-sound bell sound, there may be considerable differences in the sound source.

Therefore, when receiving a ring signal in the wire/wireless telephone system having such a portable device, different sound sources are created since calling tones of the fixed device and the portable device are different from each other. As a result, when the fixed device is located near the portable device, a user may hear unpleasant calling tones owing to the different calling tones.

In a recent telephone using high quality chords, a body or base (the fixed device) has a calling tone composed of a sound source with more than forty chords and the portable device has a single-sounded calling tone. Thus, when the fixed device and the portable device simultaneously ring with the calling tone, a user may hear a very unpleasant calling tone.

To solve the above problem, the present applicant filed a Korean Patent Application No. 10-1996-0045743, entitled METHOD FOR GENERATING RING RECEIVING SOUND IN WIRELESS TELEPHONE, published on 9 Feb. 1999.

A fixed device of the wire/wireless telephone comprises a ring signal detector, a system controller, a display, a storage, a key input unit, a dual-tone multi-frequency (DTMF) generator, first/second/third amplifiers, a wireless modem, a speaker, a microphone, a hook switch, and a voice processor.

The ring signal detector detects a ring signal received from a local line, and supplies the detected ring receiving detection signal to the system controller.

The system controller processes a ring calling tone according to the ring receiving detection signal supplied from the ring signal detector, outputs the ring calling tone to the speaker through the first amplifier, and controls transmission of wireless data for a ring calling tone processing control signal to the portable device through the third amplifier and the wireless modem. The system controller processes a ring calling tone during ring-on time of the ring receiving detection signal, controls output of the ring calling tone through the first amplifier and the speaker, and controls transmission of a ring calling tone processing control signal to the portable device through the wireless modem during a ring-off time (idle period) of the ring receiving detection signal. In addition, the system controller controls processing of a single-sounded ring calling tone or a high-chord ring calling tone with more than forty chords according to the kind of wire/wireless telephone.

The storage unit comprises a read-only memory (ROM) storing various programs and a random access memory (RAM) temporarily storing data generated while performing a program, and has an area for setting various functions.

The key input unit has keys for inputting various functions and control commands and number keys for performing a dialing function, and supplies a key selection input signal from a user to the system controller.

The display displays various processing and operating states in accordance with a key input signal inputted from the key input unit under control of the system controller.

The DTMF generator generates a DTMF signal corresponding to the key input signal inputted through the key input unit by the user under control of the system controller, and supplies the DTMF signal to the voice processor.

The voice processor processes a voice signal from a caller received through the local line to output the voice signal through the speaker, and processes a voice signal inputted through the microphone to transmit the voice signal to the other party through the local line.

The first amplifier amplifies a calling tone processing signal generated in the system controller and the voice signal processed in the voice processor to a certain level, and outputs the amplified signals through the speaker.

The second amplifier amplifies the voice signal of the user inputted through the microphone to a certain level, and supplies the amplified signal to the voice processor.

The third amplifier amplifies the calling tone processing control signal generated in the system controller to a certain level, supplies the amplified signal to the wireless modem, and amplifies a demodulated voice signal and various data supplied from the wireless modem to a certain level to output the amplified signal and the data.

The wireless modem band-modulates a signal inputted through the third amplifier, transmits the modulated signal to the portable device through an antenna, and demodulates a signal transmitted from the portable device to a voice band signal. It then supplies the demodulated signal to the third amplifier. The wireless modem receives a radio frequency (RF) signal transmitted from the portable device by means of an RF transceiving module included therein, modulates the various signals and the data supplied through the third amplifier to an RF signal, and then transmits the RF signal to the portable device.

A portable device of a wire/wireless telephone comprises a wireless modem, a third amplifier, a system controller, a display, a storage unit, a key input unit, first/second amplifiers, a speaker, and a microphone.

The system controller controls overall operations of the portable device, receives the ring calling tone processing control signal from the fixed device, and controls ringing of the ring calling tone during an idle period of a ring signal.

The storage unit stores an identification (ID) of the portable device and various programs, and temporarily stores various data generated while executing the programs under control of the system controller.

The key input unit has number keys for performing various functions and a dialing function, and supplies to the system controller a key input signal inputted according to user selection.

The third amplifier amplifies a voice signal and various transceiving data to a predetermined level, and outputs the amplified signal and the data. The first and second amplifiers amplify a processed calling tone and a voice signal to a certain level so as to output the calling tone and the signal through the speaker, and amplifies a voice signal of a user inputted through the microphone to a certain level in order to transmit the amplified signal to the fixed device through the wireless modem.

The wireless modem modulates a voice signal to be transmitted under control of the system controller by including an RF transceiving module, transmits the modulated signal to the fixed device through an antenna as an RF signal, demodulates various signals received through the antenna, and then supplies the demodulated signals to the third amplifier.

A calling tone processing operation using the wire/wireless telephone in accordance with a configuration such as that discussed above will now be described.

When the fixed device is in a standby state, it is determined whether the ring signal is detected by the ring signal detector.

If the ring signal is not detected through a local line, the fixed device maintains the standby state and continuously checks for reception of the ring signal. If the ring signal is detected, the system controller of the fixed device generates a bell sound or a melody sound as a calling tone during a ring-on time of the detected ring signal in order to inform the user of a ring receiving signal.

While the calling tone is generated, it is determined whether a ring-off time (idle period) is detected from the detected ring signal.

If the idle period of the ring signal is not detected, the calling tone is continuously generated. In this case, the ring signal is received from the local line and has ring-on and ring-off time periods, thereby generating a ring calling tone during the ring-on time period and stopping the generation of the ring calling tone during the ring-off time period. The generation of the ring calling tone is repeated during the ring-on time period so that the user can hear the ring calling tone.

However, if the idle period of the ring signal is detected from the detected ring signal, wireless data for the ring calling tone generating control signal is transmitted to the portable device during the idle period of the ring signal by controlling the RF transceiving module of the wireless modem of the fixed device.

At this point, it is determined whether the hook switch of the fixed device is turned off. If it is determined that the hook switch is turned off, transmission of the wireless data for the ring calling tone generating control signal to the portable device is disabled. Then, a call is made with a caller by connecting a speech path with the caller through the local line.

After that, it is determined whether the hook switch is turned on during telephone conversation. If it is determined that the hook switch is turned on, the call is completed and the fixed device is initialized. In other words, the fixed device is converted into the standby state.

If it is not determined that the hook switch is turned off, the wireless data for the ring calling tone generating control signal transmitted from the fixed device is received through the RF transceiving module of the wireless modem of the portable device, and is supplied to the system controller of the portable device.

Then, the system controller of the portable device controls outputting of a calling tone, such as a bell sound or a melody sound, through the speaker according to a ring receiving control signal transmitted from the fixed device during the idle period of the ring signal.

As in the case above, after ringing of the ring calling tone in the fixed device during the ring-on time period of the ring signal and ringing of the ring calling tone in the portable device during the idle period (ring-off time), the system controller of the fixed device determines whether the hook switch is turned off in the fixed device or the portable device. At this point, if the hook switch is turned on, that is, the user does not answer the phone, the calling tone is continuously generated in the fixed device and the portable device during the ring-on and ring-off time periods.

Finally, a method for processing the calling tone of the wire/wireless telephone processes the calling tone in the fixed device and the portable device with the use of the ring-on and ring-off time periods of the detected ring signal.

However, such a method for processing the calling tone of the wire/wireless telephone has different calling tones between a body (fixed device) and the portable device while an incoming call is generated in the wire/wireless telephone having the portable device, thereby generating different sound sources. Thus, when the fixed device is located near the portable device, a user may hear unpleasant calling tones due to the different calling tones.

Also, in a recent telephone using high quality chords, if the body has a calling tone having forty chords and the portable device has a single-sound calling tone, there is a problem.

Furthermore, when calling tones are generated in the fixed device and the portable device in turn regardless of the distance between the portable device and the fixed device, the fixed device generates a high-chord calling tone and the portable device generates a single-sound calling tone. As a result, the user can become very annoyed by different calling tones.

The following patents are considered to be generally pertinent to the present invention, but are burdened by the disadvantages set forth above: U.S. Pat. No. 6,484,027 to Mauney et al., entitled ENHANCED WIRELESS HANDSET, INCLUDING DIRECT HANDSET-TO-HANDSET COMMUNICATION MODE, issued on Nov. 19, 2002; U.S. Pat. No. 6,473,628 to Kuno et al., entitled TELEPHONE SET, issued on Oct. 29, 2002; U.S. Pat. No. 5,170,172 to Weinstein, entitled ELECTRONIC ASSEMBLY FOR RANGE FINDING USING RADIO WAVE SIGNAL STRENGTH, issued on Dec. 8, 1992; U.S. Pat. No. 4,310,722 to Schaible, entitled MOBILE RADIOTELEPHONE STATION TWO-WAY RANGING SYSTEM, issued on Jan. 12, 1982; and U.S. Pat. No. 4,229,620 to Schaible, entitled MOBILE RADIOTELEPONE STATION TWO-WAY RANGING SYSTEM, issued on Oct. 21, 1980.

SUMMARY OF THE INVENTION

It is, therefore, an object of the present invention to provide an apparatus and a method for processing a calling tone of a wire/wireless telephone so as to selectively generate the calling tone according to a sensed distance by sensing the distance between a portable device and a fixed device.

Also, it is another object of the present invention to provide an apparatus and a method for processing a calling tone of a wire/wireless telephone so as to reduce user inconvenience due to disharmonious melody chords by generating a calling tone in the fixed device only when the fixed device and the portable device are located within a set distance.

To accomplish the above objects, according to one embodiment of the invention, an apparatus for processing a calling tone of a wire/wireless telephone comprises: a detector for detecting field strength of a received ring receiving generation control signal when the ring receiving generation control signal is received from the fixed device by receiving a ring signal; a distance measurer for measuring distance to the fixed device by using the electric field strength detected from the detector; and a controller for comparing the distance measured by the distance measurer with a preset reference distance, and for controlling generation of a melody sound source for a received ring according to a comparison result.

In addition, it is possible to include a storage unit storing many preset electric field strength values and distance values in accordance with the electric field strength values. The controller controls disabling of the generation of the melody sound when the distance measured by the distance measurer is less than the preset reference distance, and generates the melody sound when the measured distance is not less than the preset reference distance.

According to another embodiment of the invention, an apparatus for processing a calling tone of a wire/wireless telephone comprises: a receiver for receiving a wireless signal for a ring receiving generation control signal transmitted from a fixed device; a detector for detecting electric field strength for the ring receiving generation control signal received from the receiver; a distance measurer for comparing the field strength detected from the detector with many preset field strength values, and for measuring distance to the fixed device; a controller for controlling to disabling generation of the melody sound when the distance measured by the distance measurer is less than a preset reference distance, and for generating the melody sound when the measured distance is not less than the preset reference distance, and then generating a receiving message display control signal regardless of the measured distance; a display for displaying a ring receiving message according to the ring receiving message display control signal generated by the controller; and a storage unit for storing the preset electric field strength values and distance values corresponding to the electric field strength values.

According to a further embodiment of the invention, an apparatus for processing a calling tone of a wire/wireless telephone comprises: a key input unit for supplying a key input signal to select one of an automatic mode and a manual mode according to user selection; a detector for detecting field strength of a ring receiving generation control signal when the ring receiving generation control signal is received from the fixed device after the automatic mode is set by the key input unit and a ring is received; a distance measurer for measuring distance to the fixed device by using the electric field strength detected by the detector; and a controller for comparing the distance measured by the distance measurer with a preset reference distance, and for controlling whether to generate a melody sound for the received ring according to the comparison result.

The manual mode of the key input unit can include a first selection mode for resetting of the preset reference distance by a user, and a second selection mode for generating the melody sound through the controller during the time when the ring is received regardless of the distance measured by the distance measurer.

If the user selects the manual mode through the key input unit, the controller compares the distance measured by the distance measurer with the reference distance reset by the user through the manual mode, and controls generation of the melody sound for the received ring according to the comparison result.

When the distance measured by the distance measurer is less than the preset reference distance, the controller controls disabling of the generation of the melody sound, and generates the melody sound when the measured distance is more than the preset reference distance.

Moreover, in an apparatus for processing a calling tone of a wire/wireless telephone in accordance with another embodiment of the present invention, the apparatus comprises: a key input unit for supplying a key input signal to select one of an automatic mode and a manual mode according to user selection; a detector for detecting electric field strength of a ring receiving generation control signal when the ring receiving generation control signal is received from the fixed device after the automatic mode is set by the key input unit and a ring is received; a distance measurer for comparing the field strength detected by the detector with a plurality of preset electric field strength values, and for measuring distance to the fixed device; a controller for comparing the distance measured by the distance measurer with a preset reference distance, for controlling generation of a melody sound for a received ring according to the comparison result; a storage unit for storing preset electric field strength values and distance values corresponding to the electric field strength values when the automatic mode is selected through the key input unit, and for storing a reference distance value selected by a user under control of the controller when the manual mode is selected through the key input unit; and a display unit for displaying a ring receiving message according to a receiving message display control signal generated by the controller regardless of automatic mode or manual mode selection through the key input unit and the distance measured by the distance measurer.

According to another embodiment of the invention, an apparatus for processing a calling tone of a wire/wireless telephone comprises: a fixed device for receiving a ring signal through a local line, for generating a receiving melody sound according to the received ring signal, and for wirelessly transmitting an RF signal in accordance with a ring receiving generation control signal at the same time; and a portable device for receiving the RF signal in accordance with the ring receiving generation control signal transmitted by the fixed device, for measuring distance to the fixed device according to a detected electric field strength by detecting the electric field strength of the received RF signal, and for selectively processing a calling tone according to the measured distance to the fixed device; wherein the portable device disables the processing of the calling tone when the measured distance is less than a preset distance, and processes the calling tone when the measured distance is not less than the reference distance.

The portable device can include: a receiver for receiving a wireless signal corresponding to the ring receiving generation control signal transmitted by the fixed device; a detector for detecting electric field strength of the ring receiving generation control signal received from the receiver; a distance measurer for comparing the electric field strength detected by the detector with preset electric field strength values, and for measuring distance to the fixed device; a controller for controlling disabling of generation of a melody sound when the distance measured by the distance measurer is less than a preset reference distance, for generating the melody sound when the measured distance is not less than the preset reference distance, and for generating a receiving message display control signal regardless of the measured distance; a display for displaying a ring receiving message according to the receiving message display control signal generated by the controller; and a storage unit for storing the preset electric field strength values and distance values corresponding to the electric field strength values.

Furthermore, the portable device can include: a key input unit for supplying a key input signal for selecting one of an automatic mode and a manual mode according to user selection; a detector for detecting electric field strength of a ring receiving generation control signal when the ring receiving generation control signal is received from the fixed device after the automatic mode is set by the key input unit and a ring is received; a distance measurer for comparing the electric field strength detected by the detector with a plurality of preset field strength values, and for measuring distance to the fixed device; a controller for comparing the distance measured by the distance measurer with a preset reference distance, for controlling generation of a melody sound for the received ring according to the comparison result; a storage unit for storing the preset electric field strength values and distance values corresponding to the electric field strength values when the automatic mode is selected through the key input unit, and for storing a reference distance value selected by a user under control of the controller when the manual mode is selected through the key input unit; and a display unit for displaying a ring receiving message according to a receiving message display control signal generated by the controller regardless of automatic mode or manual mode selection through the key input unit and the measured distance.

According to an embodiment of the invention, a method of processing a calling tone of a wire/wireless telephone comprises the steps of: detecting electric field strength of a ring receiving generation control signal when the ring receiving generation control signal is received from a fixed device after a ring signal is received; measuring distance to the fixed device by using the detected electric field strength; and comparing the measured distance with a preset reference distance, and selectively generating a melody sound for a received ring according to the comparison result.

According to another embodiment of the invention, a method of processing a calling tone of a wire/wireless telephone comprises the steps of: receiving a wireless signal comprising a ring receiving generation control signal transmitted from a fixed device; detecting electric field strength for the received ring receiving generation control signal; comparing the detected electric field strength with a plurality of preset electric field strength values, and measuring distance to the fixed device; controlling disabling of generation of a melody sound when the measured distance is less than a preset reference distance, generating the melody sound when the measured distance is not less than the preset reference distance, and generating a receiving message display control signal regardless of the measured distance; and displaying a ring receiving message according to the generated receiving message display control signal.

According to another embodiment of the invention, a method of processing a ring calling tone of a wire/wireless telephone comprises the steps of: executing a mode selection step to supply a key input signal for selecting one of an automatic mode and a manual mode according to user selection; detecting electric field strength of a ring receiving generation control signal when the ring receiving generation control signal is received from the fixed device after the automatic mode is selected in the mode selection step and a ring is received; measuring distance to the fixed device by using the detected electric field strength; and comparing the measured distance with a preset reference distance, and selectively processing a calling tone for the received ring according to a the comparison result.

According to another embodiment of the invention, a method of processing a calling tone of a wire/wireless telephone comprises the steps of: executing a mode selection step to select one of an automatic mode and a manual mode according to user selection; detecting electric field strength of a received ring receiving generation control signal when the ring receiving generation control signal is received from a fixed device after a ring is received and the automatic mode is set by a user; comparing the detected electric field strength with preset field strength values, and measuring distance to the fixed device; comparing the measured distance with a preset reference distance, and selectively processing a calling tone for the received ring according to the comparison result; and displaying a ring receiving message according to a generated receiving message display control signal regardless of automatic mode or manual mode selection in the mode selection step and the measured distance.

According to another embodiment of the invention, a method of processing a calling tone of a wire/wireless telephone comprises the steps of: receiving a ring signal through a local line connected to the fixed device; processing a calling tone according to the received ring signal; wirelessly transmitting an RF signal corresponding to a ring receiving generation control signal to the portable device at the same time; receiving the RF signal corresponding to the ring receiving generation control signal transmitted from the fixed device; measuring distance to the fixed device according to detection of the electric field strength of the received RF signal; and selectively processing the calling tone according to the measured distance to the fixed device; wherein the step of processing the calling tone comprises disabling of the processing of the calling tone when the measured distance is less than a preset reference distance, and processing of the calling tone when the measured distance is not less than the reference distance.

The step of selectively processing the calling tone comprises the sub-steps of: receiving a wireless signal corresponding to a ring receiving generation control signal transmitted by the fixed device; detecting electric field strength of the received ring receiving generation control signal; comparing the detected field strength with a plurality of preset electric field strength values, and measuring distance to the fixed device; controlling disabling of generation of a melody sound when the measured distance is less than a preset reference distance, generating the melody sound source when the measured distance is not less than the preset reference distance, and generating a receiving message display control signal regardless of the measured distance; and displaying a ring receiving message according to the generated receiving message display control signal.

Furthermore, the step of selectively processing the calling tone comprises the sub-steps of: selecting one of an automatic mode and a manual mode according to user selection; detecting electric field strength of a received ring receiving generation control signal when the ring receiving generation control signal is received from the fixed device after a ring is received and the automatic mode is set by a user; comparing the detected electric field strength with a plurality of preset electric field strength values, and measuring distance to the fixed device; comparing the measured distance with a preset reference distance, and selectively processing a calling tone of the received ring according to the comparison result; generating a receiving message display control signal regardless of the measured distance; and displaying a ring receiving message according to the generated receiving message display control signal regardless of automatic mode or manual mode selection in the mode selection step and the measured distance.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF EXEMPLARY EMBODIMENTS

Reference will now be made in detail to exemplary embodiments of the present invention, which are illustrated in the accompanying drawings.

Figure 1:
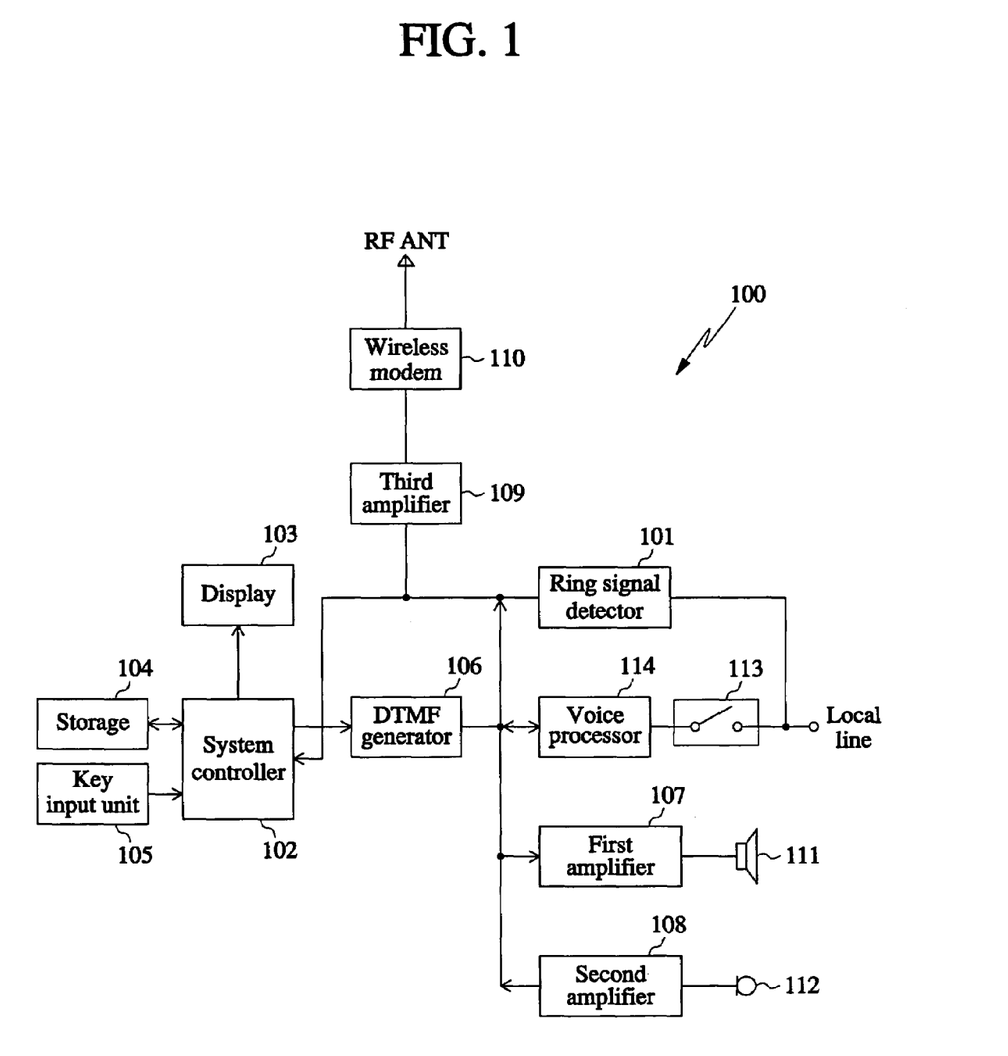
FIG. 1 is a block diagram of a fixed device in a wire/wireless telephone.
Figure 2:
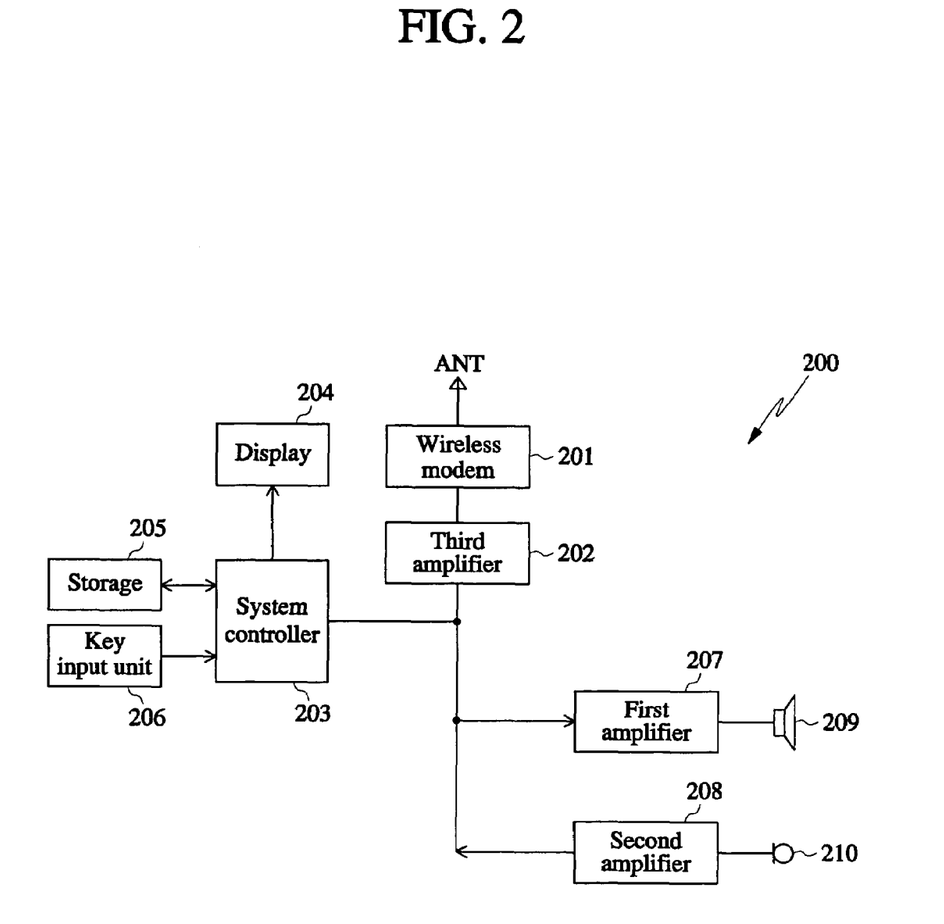
FIG. 2 is a block diagram of a portable device in a wire/wireless telephone.

FIG. 1 is a block diagram of a fixed device in a wire/wireless telephone, and FIG. 2 is a block diagram of a portable device in a wire/wireless telephone.

First, a fixed device 100 of a wire/wireless telephone comprises a ring signal detector 101, a system controller 102, a display 103, a storage 104, a key input unit 105, a DTMF generator 106, first/second/third amplifiers 107, 108, 109, a wireless modem 110, a speaker 111, a microphone 112, a hook switch 113, and a voice processor 114.

The ring signal detector 101 detects a ring signal received from a local line, and supplies a ring receiving detection signal to the system controller 102.

The system controller 102 processes a ring calling tone according to the ring receiving detection signal supplied by the ring signal detector 101, outputs the ring calling tone to the speaker 111 through the first amplifier 107, and controls transmission of wireless data for a ring calling tone processing control signal to the portable device 200 of FIG. 2 through the third amplifier 109 and the wireless modem 110. The system controller 102 processes a ring calling tone during a ring-on time of the ring receiving detection signal, controls output of the ring calling tone through the first amplifier 107 and the speaker 111, and controls transmission of a ring calling tone processing control signal to the portable device 200 through the wireless modem 110 during a ring-off time or idle period of the ring receiving detection signal. In addition, the system controller 102 controls processing of a single-sound ring calling tone or a high-chord ring calling tone with more than 40 chords according to the type of wire/wireless telephone.

The storage 104 comprises a read-only memory (ROM) for storing various programs and a random access memory (RAM) for temporarily storing data generated while performing a program, and has an area for setting various functions.

The key input unit 105 has keys for inputting various functions and control commands, and number keys for performing a dialing function, and supplies a key selection input signal of a user to the system controller 102.

The display 103 displays various processing and operating states in accordance with a key input signal inputted from the key input unit 105 under control of the system controller 102.

The DTMF generator 106 generates a DTMF signal corresponding to the key input signal inputted by the user through the key input unit 105 under control of the system controller 102, and supplies the DTMF signal to the voice processor 114.

The voice processor 114 processes a voice signal of a caller received through the local line, outputs the voice signal through the speaker 111, and processes a voice signal inputted through the microphone 112 so as to transmit the voice signal to the other party through the local line.

The first amplifier 107 amplifies a calling tone processing signal generated in the system controller 102 and the voice signal processed in the voice processor 114 to a certain level, and outputs the amplified signals through the speaker 111.

The second amplifier 108 amplifies the voice signal of the user inputted through the microphone 112 to a certain level, and supplies the amplified signal to the voice processor 114.

The third amplifier 109 amplifies the calling tone processing control signal generated in the system controller 102 to a certain level, supplies the amplified signal to the wireless modem 110, and amplifies a demodulated voice signal and various data supplied from the wireless modem 110 to a certain level to output the amplified signal and the data.

The wireless modem 110 band-modulates a signal inputted through the third amplifier 109, transmits the modulated signal to the portable device 200 through an antenna, demodulates a signal transmitted from the portable device 200 to form a voice band signal, and then supplies the demodulated signal to the third amplifier 109. The wireless modem 110 receives an RF signal transmitted by the portable device 200 by including an RF transceiving module, modulates the various signals and the data supplied through the third amplifier 109 to form an RF signal, and then transmits the RF signal to the portable device 200.

A portable device 200 of a wire/wireless telephone, as seen in FIG. 2, comprises a wireless modem 201, a third amplifier 202, a system controller 203, a display 204, a storage 205, a key input unit 206, first/second amplifiers 207, 208, a speaker 209, and a microphone 210.

The system controller 203 controls overall operation of the portable device 200, receives the ring calling tone processing control signal from the fixed device 100 described in FIG. 1, and controls generation of the ring calling tone during an idle period of a ring signal.

The storage 205 stores an ID of the portable device 200 and various programs, and temporarily stores various data generated during execution of the programs under control of the system controller 203.

The key input unit 206 has number keys for performing various functions and a dialing function, and supplies a key input signal inputted according to user selection to the system controller 203.

The third amplifier 202 amplifies a voice signal and various transceiving data to a predetermined level, and outputs the amplified signal and the data. The first amplifier 207 amplifies a processed calling tone and a voice signal to a certain level for output of the calling tone and the voice signal through the speaker 209, and the second amplifier 208 amplifies a voice signal of a user inputted through the microphone 210 to a certain level in order to transmit the amplified signal to the fixed device 100 through the wireless modem 201.

The wireless modem 201 modulates a voice signal to be transmitted under control of the system controller 203 by means of an RF transceiving module included therein, transmits the modulated signal to the fixed device 100 through an antenna as an RF signal, demodulates various signals received through the antenna, and then supplies the demodulated signals to the third amplifier 109.

A calling tone processing operation using the wire/wireless telephone in accordance with the above will now be described with reference to the accompanying drawings.

Figure 3:
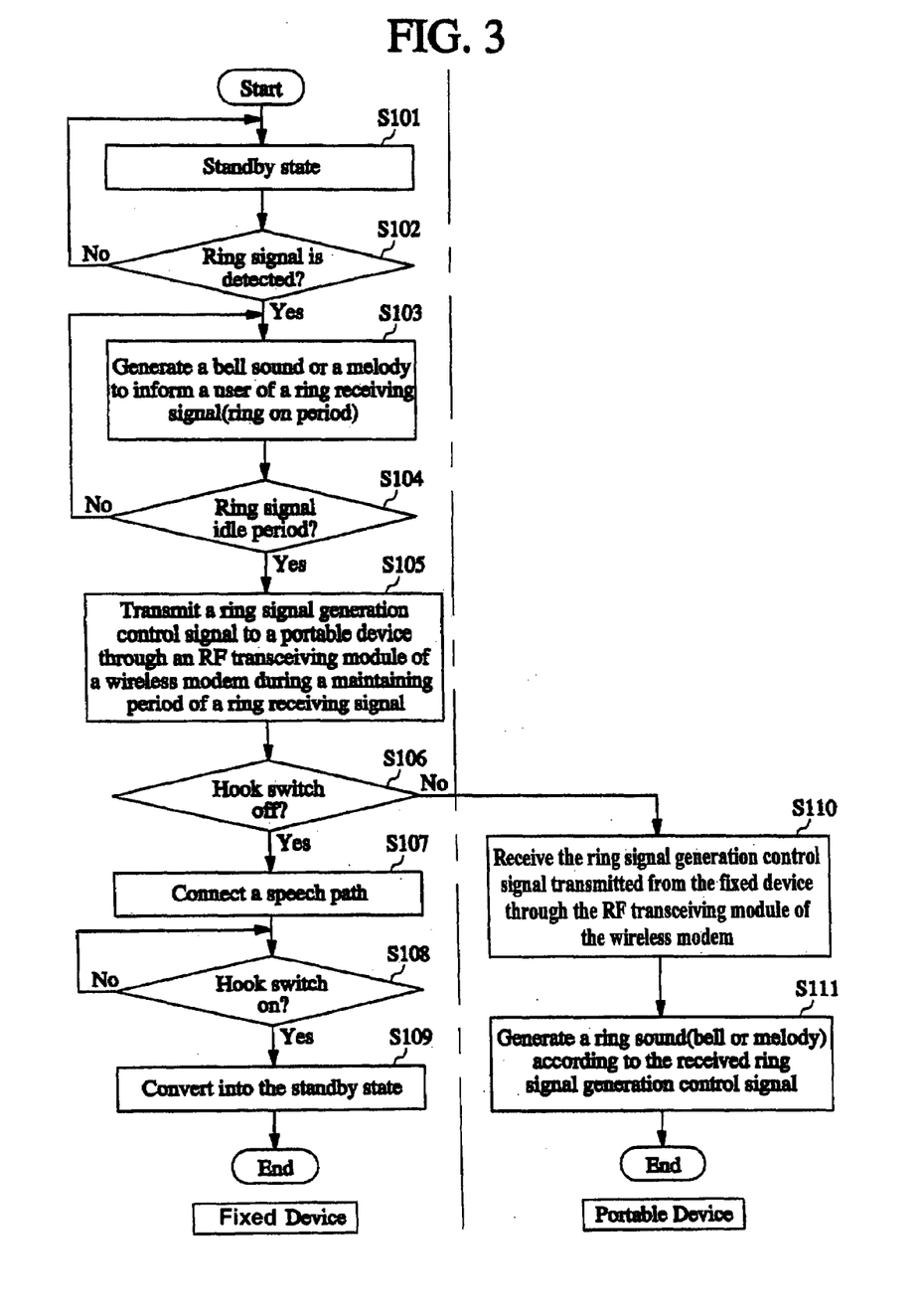
FIG. 3 is a flowchart of a method of processing a calling tone of a wire/wireless telephone.
Figure 4:
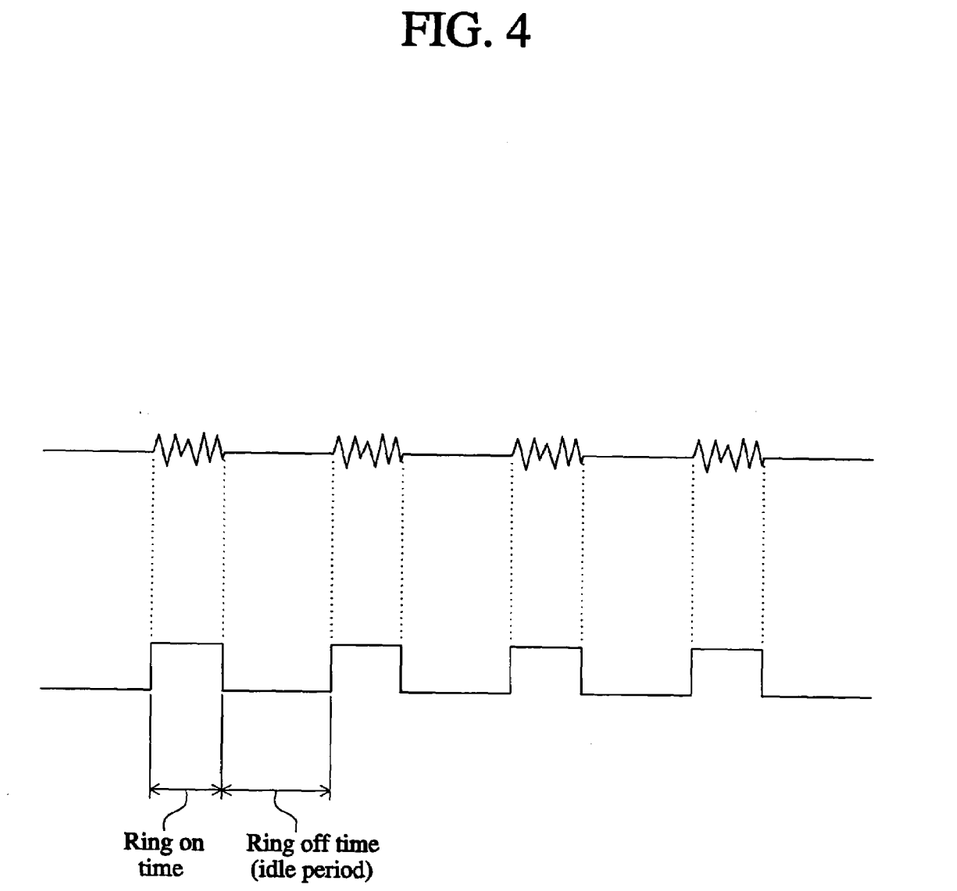
FIG. 4 is a diagram illustrating an on/off time period of a ring signal, showing the ring signal received in a wire/wireless telephone.

FIG. 3 is a flowchart of a method of processing a calling tone of a wire/wireless telephone, and FIG. 4 is a diagram illustrating an on/off time period of a ring signal, showing the ring signal received from a wire/wireless telephone.

First, when the fixed device 100 described in FIG. 1 is in a standby state (S101), it is determined whether a ring signal from the ring signal detector 101 is detected (S102).

If the ring signal is not detected through a local line, the fixed device 100 maintains the standby state and continuously checks for reception of the ring signal. If the ring signal is detected, the system controller 102 of the fixed device 100 described in FIG. 1 generates a bell sound or a melody sound as a calling tone during a ring-on time of the detected ring signal, as shown in FIG. 4, in order to inform the user of a ring receiving signal (S103).

When the calling tone is generated, it is determined whether a ring-off time (idle period) is detected from the detected ring signal, as shown in FIG. 4 (S104).

If the idle period of the ring signal is not detected, the calling tone is continuously generated. As shown in FIG. 4, the ring signal is received from the local line and has ring-on time and ring-off time periods, thereby generally generating a ring calling tone during the ring-on time period and stopping the generation of the ring calling tone during the ring-off time period. The operation of generating the ring calling tone is repeated during the ring-on time period so that the user can hear the ring calling tone.

However, in step S104, if the idle period of the ring signal is detected from the detected ring signal, wireless data for the ring calling tone generating control signal are transmitted to the portable device 200 during the idle period of the ring signal by controlling the RF transceiving module (not shown) of the wireless modem 110 (S105).

At this point, it is determined whether the hook switch 113 of the fixed device 100 is turned off (S106). If it is sensed that the hook switch is turned off, transmission of the wireless data for the ring calling tone generating control signal to the portable device 200 is disabled. Then, a call is made to a caller by connecting a speech path with the caller through the local line (S107).

Subsequently, it is determined whether the hook switch 113 is turned on during a telephone conversation (S108). If it is determined that the hook switch 113 is turned on, the call is completed so as to initialize the fixed device 100. In another words, the fixed device 100 is placed in the standby state (S109).

If it is not determined that the hook switch 113 is turned off in step S106, the wireless data for the ring calling tone generating control signal transmitted from the fixed device 100 is received through the RF transceiving module of the wireless modem 201, and is supplied to the system controller 203 of the portable device 200 (S110).

Then, the system controller 203 controls output of a calling tone, such as a bell sound or a melody sound, through the speaker 209 according to a ring receiving control signal transmitted from the fixed device 100 during the idle period of the ring signal (S111).

As described above, after generating the ring calling tone in the fixed device 100 during the ring-on time period of the ring signal and generating the ring calling tone in the portable device 200 during the idle period (ring-off time), the system controller 102 of the fixed device 100 determines whether the hook switch is turned off in the fixed device 100 or the portable device 200. At this point, if the hook switch is turned on (that is, the user does not answer the phone), the calling tone is continuously generated in the fixed device 100 and the portable device 200 during the ring-on time and ring-off time periods.

Finally, the method of processing the calling tone of the wire/wireless telephone processes the calling tone in the fixed device 100 and the portable device 200 with the use of the ring-on and ring-off time periods of the detected ring signal.

However, such method of processing the calling tone of the wire/wireless telephone has different calling tones between the fixed device 100 and the portable device 200 while an incoming call is generated in the wire/wireless telephone having the portable device 200, thereby generating different sounds. Thus, when the fixed device 100 is located near the portable device 200, a user may hear unpleasant sounds due to the different calling tones.

Also, in a recent telephone using high quality chords, if the body or fixed device 100 has a calling tone of 40 chords and the portable device has a single-sound calling tone, a problem results.

Furthermore, when calling tones are generated in the fixed device 100 and the portable device 200 regardless of distance between the portable device 200 and the fixed device 100, the fixed device 100 generates a high-chord calling tone and the portable device 200 generates a single-sound calling tone. As a result, the user can be very annoyed by different calling tones.

Figure 5:
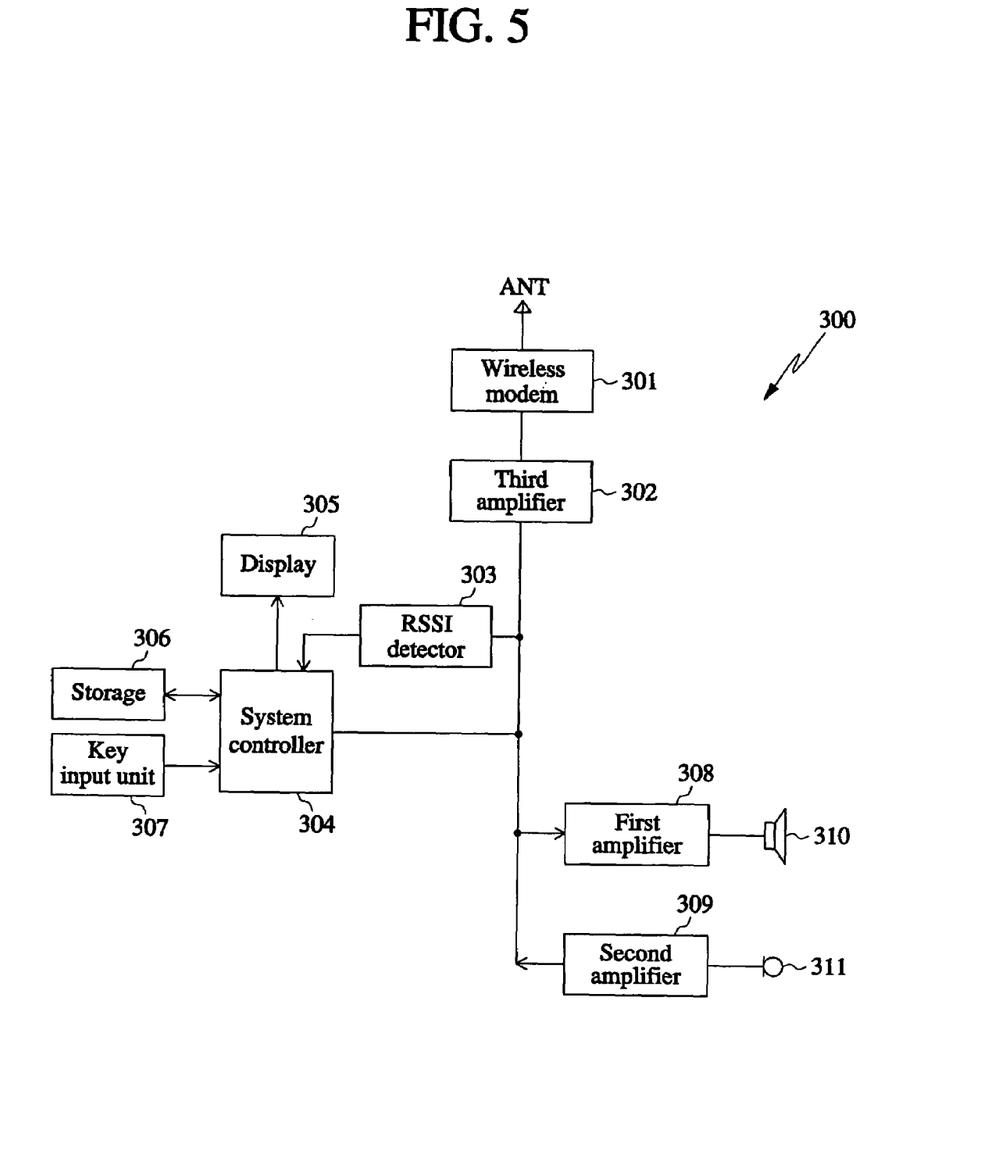
FIG. 5 is a block diagram of an apparatus for processing a calling tone in a portable device of a wire/wireless telephone in accordance with the present invention.

FIG. 5 is a block diagram of an apparatus for processing a calling tone in a portable device of a wire/wireless telephone in accordance with the present invention. With reference to FIG. 5, the portable device 300 comprises a wireless modem 301, a third amplifier 302, an RSSI detector 303, a system controller 304, a display 305, a storage 306, a key input unit 307, first/second amplifiers 308, 309, a speaker 310, and a microphone 311.

The wireless modem 301 includes an RF transceiving module, modulates a voice signal to be transmitted under control of the system controller 304, transmits the modulated signal to the fixed device 100 described in FIG. 1 through an antenna as an RF signal, and demodulates various signals received through the antenna so as to supply the demodulated signals to the third amplifier 302.

The third amplifier 302 amplifies a voice signal and various transceiving data to a predetermined level, and outputs the amplified signal and the data. The first amplifier 308 amplifies a generated calling tone and a voice signal to a certain level in order to output the calling tone and the voice signal through the speaker 310, and the second amplifier 309 amplifies a user's voice signal inputted through the microphone 311 to a certain level in order to transmit the amplified voice signal to the fixed device 100 illustrated in FIG. 1 through the wireless modem 301.

The key input unit 307 has number keys for performing various functions and dialing functions, and supplies a key input signal, inputted according to user selection, to the system controller 304.

The RSSI detector 303 detects an RSSI signal or Receiving Signal Level Detect Output signal (that is, receiving field strength of a calling tone generating control signal transmitted from the fixed device 100 illustrated in FIG. 1), and supplies the detected RSSI signal to the system controller 304.

The system controller 304 controls overall operation of the portable device 300, converts the analog RSSI signal to digital form in accordance with the calling tone generating control signal detected in the RSSI detector 303, and measures the distance to the fixed device 100 by comparing the converted digital signal with a value preset in the storage 306.

The system controller 304 determines that the distance between the portable device 300 and the fixed device 100 is more than a certain interval when a measured distance value is more than a preset reference value, and supplies a calling tone processing signal to the speaker 310 in order to control generation of a calling tone.

However, if the measured distance value is less than the preset reference value, the system controller 304 determines that the distance between the portable device 300 and the fixed device 100 is less than the certain interval, that is, it determines that the fixed device 100 and the portable device 300 are located within a set distance of each other, and disables the generation of the calling tone. The system controller 304 includes an analog/digital (A/D) converter (not shown) for converting the level signal detected in the RSSI detector 303 into a digital signal, and a melody generator (not shown) for generating a melody when the fixed device 100 is located in a position separate from the portable device 300.

The storage 306 stores an ID of the portable device 300 and various programs, and temporarily stores various data generated while executing the programs under control of the system controller 304. In addition, a distance value to the fixed device 100 in accordance with an electric field strength value can be stored in a table by the calling tone generating control signal received from the fixed device 100.

The operation of an apparatus for processing a calling tone of a wire/wireless telephone in accordance with the present invention and having such a configuration will be more fully described with reference to FIG. 1 and FIG. 5.

First, when a ring signal is inputted through a local line connector of the fixed device 100 shown in FIG. 1, the ring signal detector 01 detects whether the ring signal is inputted.

If the ring signal is detected in the ring signal detector 101, the detected ring detection signal is supplied to the system controller 102 of the fixed device 100.

The system controller 102 generates a high-chord (for instance, 40 chords) melody signal through a melody configuration unit (not shown) contained in the system controller 102 in order that a user can recognize that a ring signal is received according to the ring detection signal detected in the ring signal detector 101. The generated melody signal is supplied to the first amplifier 107. The first amplifier 107 amplifies the supplied high-chord melody signal to a certain level, and outputs the amplified signal through the speaker 111. Thus, the user can recognize the received ring through a high-chord melody sound outputted through the speaker 111.

The system controller 102 of the fixed device 100 generates a ring receiving generation control signal (ring receiving message) in order to transmit a ring receiving signal to the portable device 300, and supplies the ring receiving generation control signal to the third amplifier 109.

The third amplifier 109 amplifies the ring receiving generation control signal supplied from the system controller 102 to a certain level, and supplies the amplified ring receiving generation control signal to the wireless modem 110.

The wireless modem 110 modulates the ring receiving generation control signal amplified through the third amplifier 109 to form an RF signal through an internal RF transceiving module, and wirelessly transmits the modulated RF signal to the portable device 300 through an antenna.

As described above, the ring receiving generation control signal transmitted from the fixed device 100 is received by the wireless modem 301 through an antenna of the portable device 300 illustrated in FIG. 5. The wireless modem 301 can include an RF transceiving module (not shown).

The RF transceiving module of the wireless modem 301 demodulates the ring receiving generation control signal received from the antenna, and supplies the demodulated signal to the third amplifier 302.

The third amplifier 302 amplifies the demodulated ring receiving generation control signal supplied by the RF transceiving module of the wireless modem 301 to a certain level, and supplies the amplified signal to the RSSI detector 303.

The RSSI detector 303 detects an RSSI (Received Signal Strength Indication) signal of the RF signal from the ring receiving generation control signal received through the third amplifier 302. In another words, the RSSI detector 303 detects a receiving electric field strength of the RF signal for the ring receiving generation control signal transmitted from the fixed device 100.

The detected RSSI signal is supplied to the system controller 304.

The system controller 304 senses the distance between the fixed device 100 and the portable device 300 by using the RSSI signal, that is, an RSSI of the received RF signal supplied from the RSSI detector 303.

Namely, the system controller 304 compares the RSSI detected in the RSSI detector 303 with a reference RSSI prestored in the storage 306, and determines the distance between the fixed device 100 and the portable device 300.

If the determined distance between the fixed device 100 and the portable device 300 is more than a preset reference distance, a melody generator inside the system controller 304 is enabled to generate a melody. The generated melody is supplied to the first amplifier 308, amplified therein to a certain level, and outputted through the speaker 310. Simultaneously, the system controller 304 displays a ring receiving message on the display 305 so that the user can directly see that a ring is received. In this way, the user can easily confirm that a call is received.

However, if the distance between the fixed device 100 and the portable device 300 is less than the preset reference distance, the system controller 304 controls the generation of the melody by disabling the melody generator. While disabling the generation of the melody, the ring receiving message is displayed on the display 305 so that the user can confirm the received ring.

Hereinafter, a method of processing a calling tone of a wire/wireless telephone in accordance with the present invention corresponding to the above operation will be described through the flowchart of FIG. 6.

Figure 6:
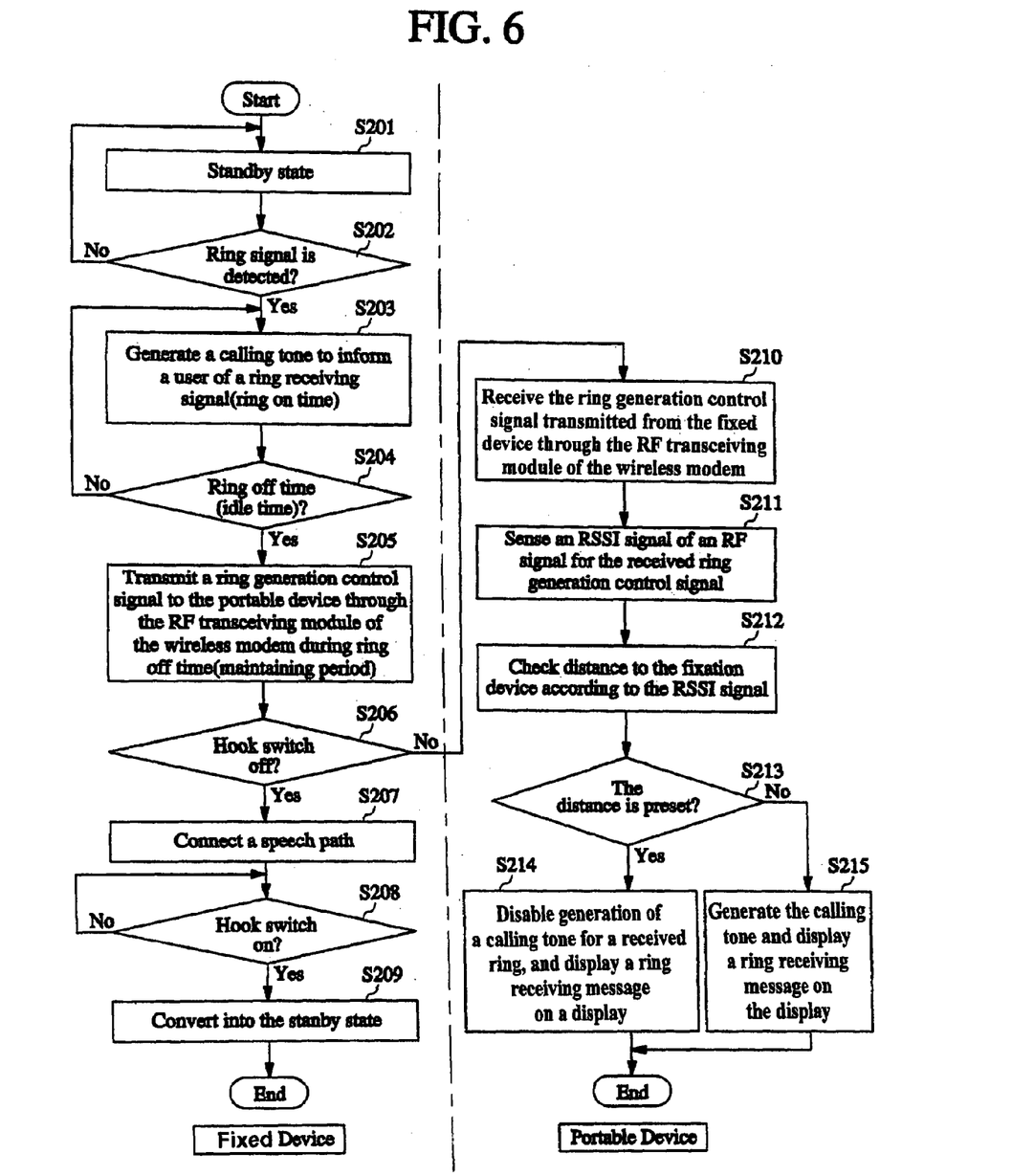
FIG. 6 is a flowchart of a method of processing a calling tone of a wire/wireless telephone in accordance with the present invention.

FIG. 6 is a flowchart of a method of processing a calling tone of a wire/wireless telephone in accordance with the present invention.

First, when the fixed device 100 shown in FIG. 1 is in a standby state (S201), it is determined whether a ring signal from the ring signal detector 101 is detected (S202).

If the ring signal is not detected through a local line, the fixed device 100 continuously checks as to whether the ring signal is received while maintaining the standby state. If the ring signal is detected, the system controller 102 of the fixed device 100 shown in FIG. 1 generates a bell sound or a melody sound as a calling tone during a ring-on time of the detected ring signal shown in FIG. 4 in order to inform the user of a ring receiving signal (S203).

While generating the calling tone, it is determined whether the ring-off time (idle period) shown in FIG. 4 is detected from the detected ring signal (S204).

If a ring signal idle period is not detected, the calling tone is continuously generated. The ring signal received from the local line is shown in FIG. 4, and has ring-on and ring-off time periods, thereby generating a calling tone during the ring-on time period and stopping the generation of the calling tone during the ring-off time period. The operation of generation of the calling tone is repeated during the ring-on time period again, and thus the user can listen to a ring receiving sound.

However, in step S204, if the ring signal idle period is detected from the detected ring signal, wireless data for a ring receiving sound generation control signal is transmitted to the portable device 300 during the idle period of the ring signal by controlling the RF transceiving module of the wireless modem 110 (S205).

At this point, it is determined whether the hook switch 113 of the fixed device 100 is turned off (S206). If it is determined that the hook switch is turned off, transmission of the wireless data for the ring receiving sound generation control signal to the portable device 300 is disabled, and a call to a caller is made by connecting a speech path with the caller through the local line.

Then, it is determined whether the hook switch 113 is turned on during a telephone conversation (S208). If it is determined that the hook switch 113 is turned on, the call is completed to initialize the fixed device 100, that is, the fixed device 100 is converted into the standby state (S209).

On the other hand, if the hook switch 113 is turned on in step S206, the RF transceiving module of the wireless modem 301 of the portable device 300 receives the ring generation control signal transmitted by the fixed device 100 (S210).

After that, the RSSI signal of the RF signal for the ring receiving generation control signal received through the RF transceiving module of the portable device 300 is detected by the RSSI detector 303 (S211). In other words, the RSSI detector 303 detects a receiving electric field strength of the RF signal for the ring receiving generation control signal transmitted by the fixed device 100.

The detected RSSI signal is supplied to the system controller 304. The system controller 304 determines the distance between the fixed device 100 and the portable device 300 by using an RSSI supplied by the RSSI detector 303 (S212).

Then, it is determined whether the distance between the fixed device 100 and the portable device 300, as determined by system controller 304, is less than a preset reference distance (S213).

If the distance between the fixed device 100 and the portable device 300 is more than the preset reference distance (that is, if the distance between the fixed device 100 and the portable device 300 is more than the reference distance), a melody generator inside the system controller 304 is enabled to generate a melody, and a ring receiving message is displayed on the display 305 of the portable device 300 (S215).

However, in step S213, if the distance between the fixed device 100 and the portable device 300 is less than the preset reference distance, the melody generator is controlled to disable the generation of the melody and the ring receiving message is displayed on the display 305 of the portable device 300 (S214).

An apparatus and a method for processing a calling tone of a wire/wireless telephone in accordance with the present invention control generation of a ring receiving signal by using ring-on and ring-off time periods of a ring signal received from the fixed device 100 of the wire/wireless telephone. However, the same method can be applied when a ring receiving generation control signal is transmitted to the portable device 300 from the fixed device 100 regardless of the ring-on and ring-off time periods with a different method.

The apparatus and the method for processing the calling tone of the wire/wireless telephone in accordance with the present invention automatically control whether a melody is generated according to a detected distance between the fixed device 100 and the portable device 300 through an RSSI process. However, in another embodiment, manual controlling (that is, controlling the above operation according to user selection) will fall within the scope of the invention as will be evident to those skilled in the art.

More specifically, automatic and manual modes are incorporated into the key input unit 307 of the portable device 300 illustrated in FIG. 5 so as to perform a melody generation controlling operation according to user selection. In another words, if a user selects the automatic mode, the system controller 304 internally sets the automatic mode, and controls melody generation with the same method as in the above operation. Conversely, if the user selects the manual mode through the key input unit 307, a ring receiving melody is generated in the fixed device 100 and the portable device 300, regardless of an RSSI signal.

For another manual mode function, the user can optionally use the key input unit 307 to select a reference distance between the fixed device 100 and the portable device 300 for storage in the storage 306 of the portable device 300, thereby setting the reference distance.

In addition, in the above embodiment, the fixed device 100 is described as having a melody generator for generating a high-chord melody, and the portable device 300 is described as having a melody generator for generating a single-sound melody or a buzzer. However, in the present invention, it is possible to apply melodies generated in the fixed device 100 and the portable device 300, regardless of the melody types.

Finally, in the apparatus and the method for processing the calling tone of the wire/wireless telephone in accordance with the present invention, the fixed device 100 senses a ring signal when the ring signal is received through a local line connector of the fixed device 100, generates a single sound or a high-chord melody according to the sensed ring signal, and simultaneously transmits a ring receiving generation control signal to the portable device 300 as an RF signal.

The portable device 300 senses the electric field strength of the RF signal for the ring receiving generation control signal transmitted from the fixed device 100, and measures the distance between the fixed device 100 and the portable device 300 according to the sensed electric field strength. If the measured distance is less than a preset reference distance, the portable device 300 disables generation of a melody, and the melody is generated in the fixed device 100 only.

In the apparatus and the method for processing the calling tone of the wire/wireless telephone in accordance with the present invention as described above, if an RF signal corresponding to a ring receiving generation control signal is transmitted to the portable device 300 from the fixed device 100 after a ring signal is received in the fixed device 100 of the wire/wireless telephone, the portable device 300 measures the distance between the fixed device 100 and the portable device 300 according to electric field strength of the RF signal transmitted by the fixed device 100. If the measured distance is less than a preset reference distance, the portable device 300 disables generation of a melody and the melody is generated in the fixed device 100 only. Thus, when the fixed device 100 is near the portable device 300, only the fixed device 100 generates the melody for receiving a ring, thereby effectively solving the problem of user inconvenience caused by lack of harmony between melody chords generated in the fixed device 100 and the portable device 300.

Moreover, regardless of the kind of wire/wireless telephone used, the present invention selectively controls a melody sound according to the distance between the fixed device 100 and the portable device 300 so that a user can select automatic and manual modes. Therefore, it is possible to supply various functions of the wire/wireless telephone to satisfy customer requirements. As a result, advantages to the purchasing customer are achieved.

Although preferred embodiments of the present invention have been described, it will be understood by those skilled in the art that the present invention should not be limited to the described preferred embodiments. Rather, various changes and modifications can be made within the spirit and scope of the present invention, as defined by the following claims.

What is claimed is:

1. An apparatus for processing a calling tone of a portable device in a wire/wireless telephone, said apparatus comprising:
   a detector providing an indication of electric field strength of a ring receiving generation control signal when the ring receiving generation control signal is received from a fixed device after a ring signal is received;
   a distance gauge obtaining a representation of a distance to the fixed device by using the indication of the electric field strength provided by the detector; and
   a controller controlling generation of a melody sound for a received ring according to a comparison between the representation of the distance and a reference distance.

2. The apparatus of claim 1, wherein the distance gauge includes a comparator for comparing the indication of the electric field strength detected by the detector means to a plurality of preset electric field strength values corresponding to distance values between the portable device and the fixed device.

3. The apparatus of claim 2, further comprising storage means for storing the preset electric field strength values and distance values corresponding to the electric field strength values.

4. The apparatus of claim 1, further comprising storage means for storing the preset electric field strength values and distance values corresponding to the electric field strength values.

5. The apparatus of claim 1, further comprising display means for displaying a ring receiving message corresponding to a receiving message display control signal generated in the controller means regardless of the distance measured by the distance gauge.

6. The apparatus of claim 1, wherein the controller means disables generation of the melody sound when the distance measured by the distance gauge is less than the preset reference distance, and generates the melody sound when the measured distance is not less than the preset reference distance.

7. An apparatus for processing a calling tone of a portable device in a wire/wireless telephone, said apparatus comprising:
   key input means for supplying a key input signal to select one of an automatic mode and a manual mode;
   detector means for detecting electric field strength of a ring receiving generation control signal when the ring receiving generation control signal is received from a fixed device after the automatic mode is set by the key input unit means and a ring is received;
   distance measurer means for comparing the electric field strength detected by the detector means to preset electric field strength values so as to measure distance to the fixed device; and
   controller means for comparing the measured distance to a preset reference distance, and for controlling generation of a melody sound for a received ring signal according to a comparison result.

8. The apparatus of claim 7, wherein the manual mode of the key input means includes a first selection mode for resetting the preset reference distance and a second selection mode for generation of the melody sound by the controller whenever the ring signal is received without regard to the distance measured by the distance measurer means.

9. The apparatus of claim 8, wherein when a user selects the manual mode by means of the key input means, the controller means compares the distance measured by the distance measurer means to the reference distance reset by the user in the manual mode, and controls generation of the melody sound for the received ring according to the comparison result.

10. The apparatus of claim 7, further comprising a storage unit, and wherein, when the automatic mode is selected by means of the key input means, the preset electric field strength values and distance values corresponding to the preset electric field strength values are stored in the storage unit, and when the manual mode is selected by means of the key input means, the storage unit stores a reference distance value selected by the user under control of the controller means.

11. The apparatus of claim 7, further comprising display means for displaying a ring receiving message corresponding to a receiving message display control signal generated in the controller means regardless of mode selection by means of the key input means and the distance measured by the distance measurer means.

12. The apparatus of claim 7, wherein the controller means disables the generation of the melody sound when the distance measured by the distance measurer means is less than the preset reference distance, and generates the melody sound when the measured distance is not less than the preset reference distance.

13. An apparatus for processing a calling tone of a wire/wireless telephone, said apparatus comprising:
    a fixed device for receiving a ring signal through a local line, for generating a receiving melody sound corresponding to the received ring signal, and for wirelessly transmitting a signal corresponding to a ring receiving generation control signal at the same time; and
    a portable device for receiving the signal corresponding to the ring receiving generation control signal transmitted by the fixed device, for measuring distance to the fixed device according to a detected electric field strength by detecting the electric field strength of the received signal, and for selectively generating a calling tone according to the measured distance to the fixed device;
    wherein the portable device disables generation of the calling tone when the measured distance is less than a preset reference distance, and generates the calling tone when the measured distance is not less than the reference distance.

14. The apparatus of claim 13, wherein the portable device comprises:
    a receiver for receiving a wireless signal corresponding to the ring receiving generation control signal transmitted by the fixed device;
    a detector for detecting an electric field strength corresponding to the ring receiving generation control signal received from the receiver;
    a distance measurer for comparing the electric field strength detected by the detector to preset electric field strength values, and for measuring distance to the fixed device;
    a controller for disabling generation of a melody sound when the distance measured by the distance measurer is less than the reference distance, for generating the melody sound when the measured distance is not less than the reference distance, and for generating a receiving message display control signal regardless of the measured distance;
    a display for displaying a ring receiving message corresponding to the receiving message display control signal generated by the controller; and
    a storage for storing the preset electric field strength values and distance values corresponding to the preset electric field strength values.

15. The apparatus of claim 13, wherein the portable device comprises:
    a key input unit for supplying a key input signal for selecting one of an automatic mode and a manual mode according to a user selection;
    a detector for detecting electric field strength of a ring receiving generation control signal when the ring receiving generation control signal is received from the fixed device after the automatic mode is set by the key input unit and a ring is received;
    a distance measurer for comparing the electric field strength detected by the detector to preset electric field strength values, and for measuring the distance to the fixed device;
    a controller for comparing the distance measured by the distance measurer with the preset reference distance, and for controlling generation of a melody sound for the received ring signal according to a comparison result;
    a storage for storing the preset electric field strength values and distance values corresponding to the preset electric field strength values when the automatic mode is selected by the key input unit, and for storing a reference distance value selected by a user under control of the controller when the manual mode is selected by the key input unit; and
    a display for displaying a ring receiving message corresponding to a receiving message display control signal generated in the controller regardless of mode selection by the key input unit and the distance measured by the distance measurer.

16. The apparatus of claim 13, further comprising a key input unit and a distance measurer, wherein when a user selects a manual mode by means of the key input unit, the controller compares a distance measured by the distance measurer to a reference distance reset by the user in the manual mode, and controls generation of a melody sound corresponding to a received ring signal according to a comparison result.

17. A method of processing a calling tone of a portable device in a wire/wireless telephone, comprising the steps of:
    receiving a wireless signal comprising a ring receiving generation control signal transmitted from a fixed device;
    detecting an electric field strength of the received ring receiving generation control signal;
    measuring a distance to the fixed device by comparing the detected electric field strength with preset electric field strength values;
    generating a receiving message display control signal regardless of the measured distance;
    disabling generation of a melody sound when the measured distance is less than a preset reference distance;
    generating the melody sound when the measured distance is not less than the preset reference distance; and displaying a ring receiving message corresponding to the ring receiving message display control signal.

18. A method of processing a calling tone of a portable device in a wire/wireless telephone, comprising the steps of:
supplying a key input signal to select one of an automatic mode and a manual mode according to user selection;
detecting an electric field strength of a ring receiving generation control signal when the ring receiving generation control signal is received from a fixed device after the automatic mode is selected in the supplying step and a ring is received;
measuring a distance to the fixed device by comparing the detected electric field strength to preset electric field strength values; and
disabling generation of a melody sound when the measured distance is less than the preset reference distance, and generating the melody sound when the measured distance is not less than a preset reference distance.

19. The method of claim 18, wherein, in the step of generating the melody sound when the manual mode is selected by a user, the measured distance is compared to a reference distance reset by the user in the manual mode, and a calling tone for a received ring signal is selectively processed according to a comparison result.

20. A method of processing a calling tone of a wire/wireless telephone having a fixed device and a portable device, comprising the steps of:
receiving a ring signal through a local line connected to the fixed device;
processing in the fixed device a calling tone corresponding to the received ring signal;
wirelessly transmitting a signal, in accordance with a ring receiving generation control signal, from the fixed device to the portable device; and
receiving in the portable device the signal, in accordance with the ring receiving generation control signal transmitted from the fixed device;
measuring distance from the portable device to the fixed device according to a detected electric field strength by detecting the electric field strength of the received signal;
selectively processing the calling tone in the portable device according to the measured distance to the fixed device;
wherein the processing step in the portable device disables the processing of the calling tone when the measured distance is less than a preset reference distance, and generates the calling tone when the measured distance is not less than the preset reference distance.

21. The method of claim 20, wherein the processing step in the portable device comprises the sub-steps of:
receiving a wireless signal comprising a ring receiving generation control signal transmitted from the fixed device to the portable device;
detecting an electric field strength of the ring receiving generation control signal;
measuring a distance to the fixed device by comparing the detected electric field strength to preset electric field strength values;
generating a receiving message display control signal regardless of the measured distance;
disabling generation of a melody sound when the measured distance is less than the preset reference distance;
generating the melody sound when the measured distance is not less than the preset reference distance; and
displaying a ring receiving message in accordance with the generated receiving message display control signal.

22. The method of claim 20, wherein the processing step comprises the sub-steps of:
selecting one of an automatic mode and a manual mode according to user selection;
detecting an electric field strength of the ring receiving generation control signal when the ring receiving generation control signal is received from the fixed device after a ring is received and the automatic mode is selected by a user;
measuring a distance to the fixed device by comparing the detected electric field strength to preset electric field strength values;
selectively processing a calling tone for a received ring according to a comparison result obtained by comparing the measured distance to the preset reference distance; and
displaying a ring receiving message corresponding to a generated receiving message display control signal regardless of mode selection and the measured distance.

23. The method of claim 22, wherein when the manual mode is selected in the selecting sub-step, the measured distance is compared to a reference distance reset by the user in the manual mode, and the calling tone for the received ring is selectively processed according to a comparison result.

* * * * *